(12) United States Patent
Dickinson et al.

(10) Patent No.: US 8,514,187 B2
(45) Date of Patent: Aug. 20, 2013

(54) METHODS AND APPARATUS FOR DISTINGUISHING BETWEEN TOUCH SYSTEM MANIPULATORS

(75) Inventors: Timothy Dickinson, Crystal Lake, IL (US); William Alberth, Prairie Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 526 days.

(21) Appl. No.: 12/570,140

(22) Filed: Sep. 30, 2009

(65) Prior Publication Data

US 2011/0074701 A1 Mar. 31, 2011

(51) Int. Cl.
*G06F 3/041* (2006.01)

(52) U.S. Cl.
USPC .......................................... 345/173; 345/174

(58) Field of Classification Search
USPC .................................. 345/173, 174
See application file for complete search history.

(56) References Cited

U.S. PATENT DOCUMENTS

| | | | |
|---|---|---|---|
| 5,945,980 | A | 8/1999 | Moissev et al. |
| 5,956,020 | A | 9/1999 | D'Amico et al. |
| 6,729,547 | B1 | 5/2004 | Charlier et al. |
| 7,077,594 | B1 | 7/2006 | Annerino et al. |
| 7,567,242 | B2 | 7/2009 | Perkins et al. |
| 8,094,136 | B2 * | 1/2012 | Eliasson et al. ............... 345/175 |
| 2001/0006383 | A1 | 7/2001 | Fleck et al. |
| 2002/0080123 | A1 | 6/2002 | Kennedy et al. |
| 2006/0017709 | A1 * | 1/2006 | Okano .......................... 345/173 |
| 2007/0242056 | A1 * | 10/2007 | Engelhardt et al. ............ 345/173 |
| 2008/0284743 | A1 | 11/2008 | Hsu et al. |
| 2008/0284753 | A1 * | 11/2008 | Hsu et al. ....................... 345/174 |
| 2010/0321338 | A1 | 12/2010 | Ely |
| 2011/0001708 | A1 * | 1/2011 | Sleeman ....................... 345/173 |

FOREIGN PATENT DOCUMENTS

| | | |
|---|---|---|
| EP | 1993025 A2 | 11/2008 |
| EP | 1993028 A2 | 11/2008 |
| WO | 03065192 A1 | 8/2003 |
| WO | 2007122444 A1 | 11/2007 |

OTHER PUBLICATIONS

HTC Patents Capacitive Stylus: http://pocketpc-live.com/htc/htc-magnetic-stylus.html., Aug. 21, 2009.
Appleinsider, "Apple Looks to Improve Pen-Based Input on Tablet Touchscreens", Nov. 12, 2009, pp. 1-2, http://www.appleinsider.com/articles/09/11/12/apple_looks_to_improve_pen_based_input_on_tablet_touchscreens.html.
Ten One Design LLC, "The Classic Pogo Stylus", Pogo Stylus, 2010, pp. 1-17, http://www.tenonedesign.com/stylus.php.
PCT Search Report, PCT/US2010/048345 dated Dec. 1, 2010.
United States Patent and Trademark Office, "Non-Final Office Action" for U.S. Appl. No. 12/773,461 dated Aug. 8, 2012, 9 pages.
United States Patent and Trademark Office, "Final Office Action" for U.S. Appl. No. 12/773,461 dated Oct. 4, 2012, 11 pages.

* cited by examiner

*Primary Examiner* — Latanya Bibbins (57) ABSTRACT

A touch system user interface determines a signal profile associated with the use of a manipulator with a touch sensor component. The signal profile corresponding to a plurality of signal levels along a surface of the touch sensor component. The system calculates a geometrical attribute of that portion of the signal profile that exceeds a threshold signal value (e.g., the area or shape of the region) and determines a type of the manipulator (e.g., stylus, human finger, etc.) based on the calculated geometrical attribute.

18 Claims, 7 Drawing Sheets

METHODS AND APPARATUS FOR DISTINGUISHING BETWEEN TOUCH SYSTEM MANIPULATORS

The subject matter described herein generally relates to touch systems, such as capacitive touch pads, touchscreens, and the like, and more particularly relates to methods for operating such touch systems with multiple manipulator types.

BACKGROUND

Touch systems, such as touchscreen displays, touch pads, and the like, have become an increasingly popular type of input/output device, and are often used in connection with smartphones, e-book readers, table computers, and other such computing devices.

Many touch systems are capable of being operated using multiple manipulator types. That is, the user may employ one or more fingers, fingernails, and/or a stylus to interact with the system, and the system attempts to adjust the gain and other input settings applied to touch events based on the manipulator type.

Currently known touch systems that are configured to interact with multiple manipulator types are unsatisfactory in a number of respects. For example, as the shape, area, and amplitude resulting from a touch event can vary widely, it is often difficult to detect which type of manipulator is being used at a given time and to adjust the input settings accordingly. This is particularly a problem in cases where the user switches between manipulator types during a user interface session.

Accordingly, there is a need for improved methods for operating touch systems using multiple manipulator types. Other desirable features and characteristics of the present embodiments will become apparent from the subsequent detailed description and the appended claims, taken in conjunction with the accompanying drawings and the foregoing technical field and background.

BRIEF DESCRIPTION OF THE DRAWINGS

A more complete understanding of the various embodiments may be derived by referring to the detailed description and claims when considered in conjunction with the following figures, wherein like reference numbers refer to similar elements throughout the figures.

DETAILED DESCRIPTION

In general, the subject matter described herein relates to systems and methods for distinguishing between manipulator types (e.g., a finger, a stylus, etc.) based on a threshold metric that includes, for example, a threshold amplitude and a threshold cross-sectional area or other attribute of a signal profile associated with a touch event.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to touch screen displays, user interface components, and the like, need not be described herein.

Figure 1:
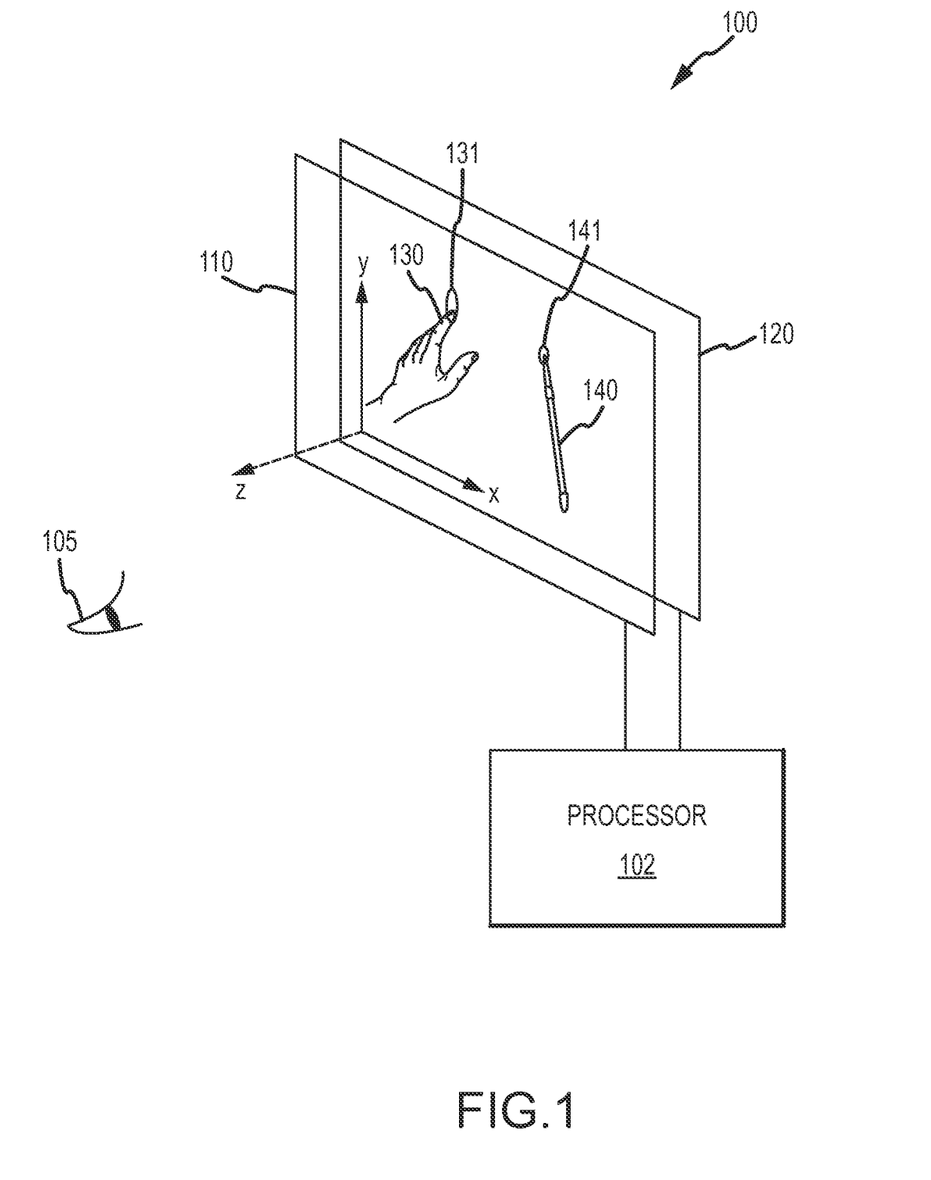
FIG. 1 depicts a touch system useful in describing the present embodiments.

FIG. 1 is a conceptual overview of an exemplary touch system 100 useful in describing various embodiments. In general, a touch sensor component 110 is configured to interact with various manipulators, such as a human finger 130, or a stylus 140. Each type of manipulator, when in contact or close proximity to touch sensor component 110 (e.g., in regions 131 and 141, as illustrated), produces a signal that can be received and interpreted as a touch event by a processor 102, which is suitably configured (through any combination of hardware and software components) to determine the location and any other selected attributes of regions 131 and 141.

Touch sensor component 110 may be superimposed upon a display 120, viewable by a user 105, thereby forming what is conventionally known as a touchscreen display. In this regard, touch system 100 may include one or more of a variety of different types of displays 120 and sensor components no known in the art for displaying information and receiving input from a manipulator. Examples of such displays include capacitive displays, resistive displays, surface acoustic wave (SAW) displays, optical imaging displays, and the like. Display 120 may also provide haptic feedback to the user—e.g., a clicking response or keypress feel in response to a touch event. Touch sensor 110 may be combined with display 120 and fabricated as an integral device, or may be utilized within a display 120. The present embodiments contemplate any suitable touch sensitive surface or sensor.

Figure 2:
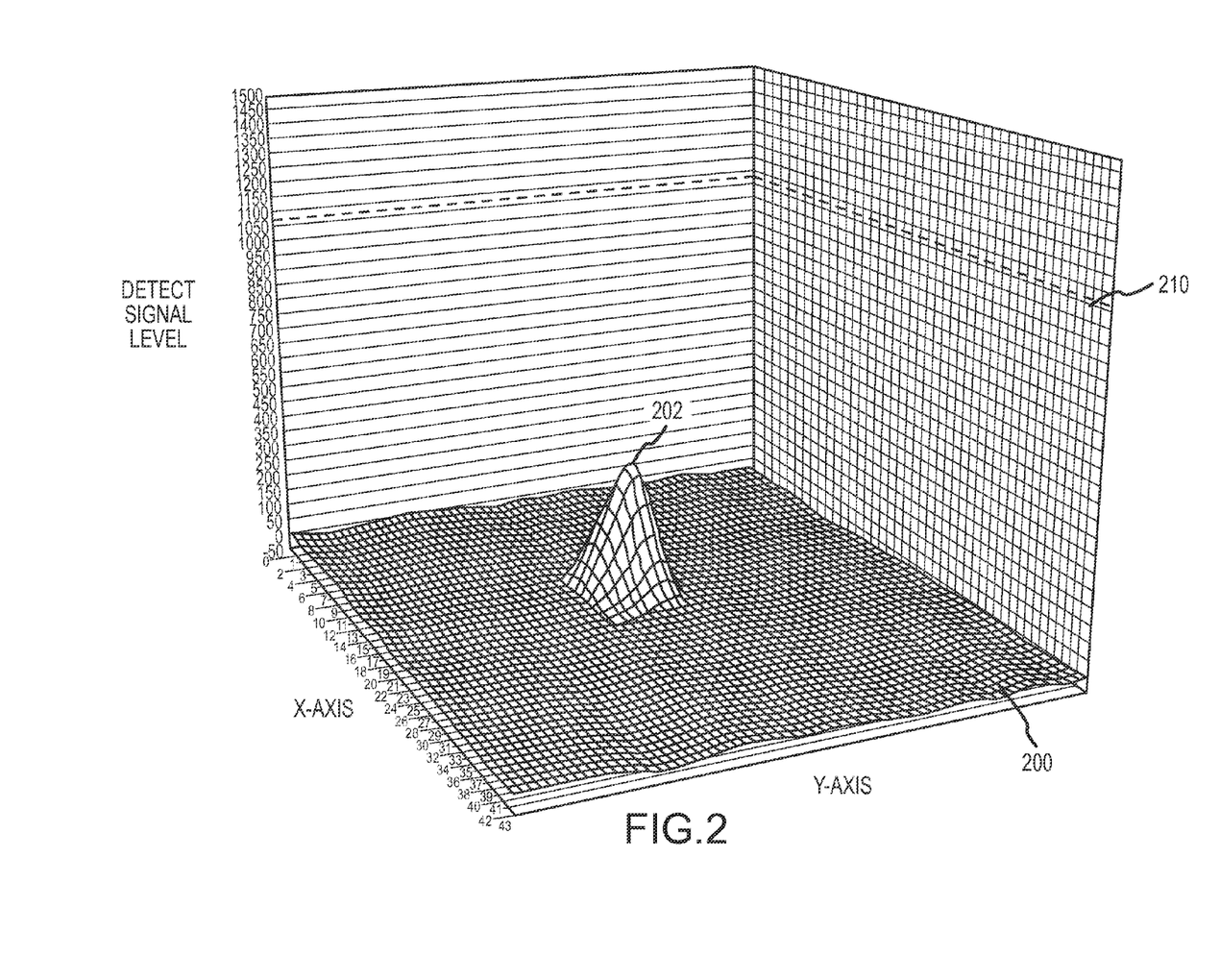
FIG. 2 illustrates a signal profile associated with a touch event produced by an exemplary manipulator.
Figure 3:
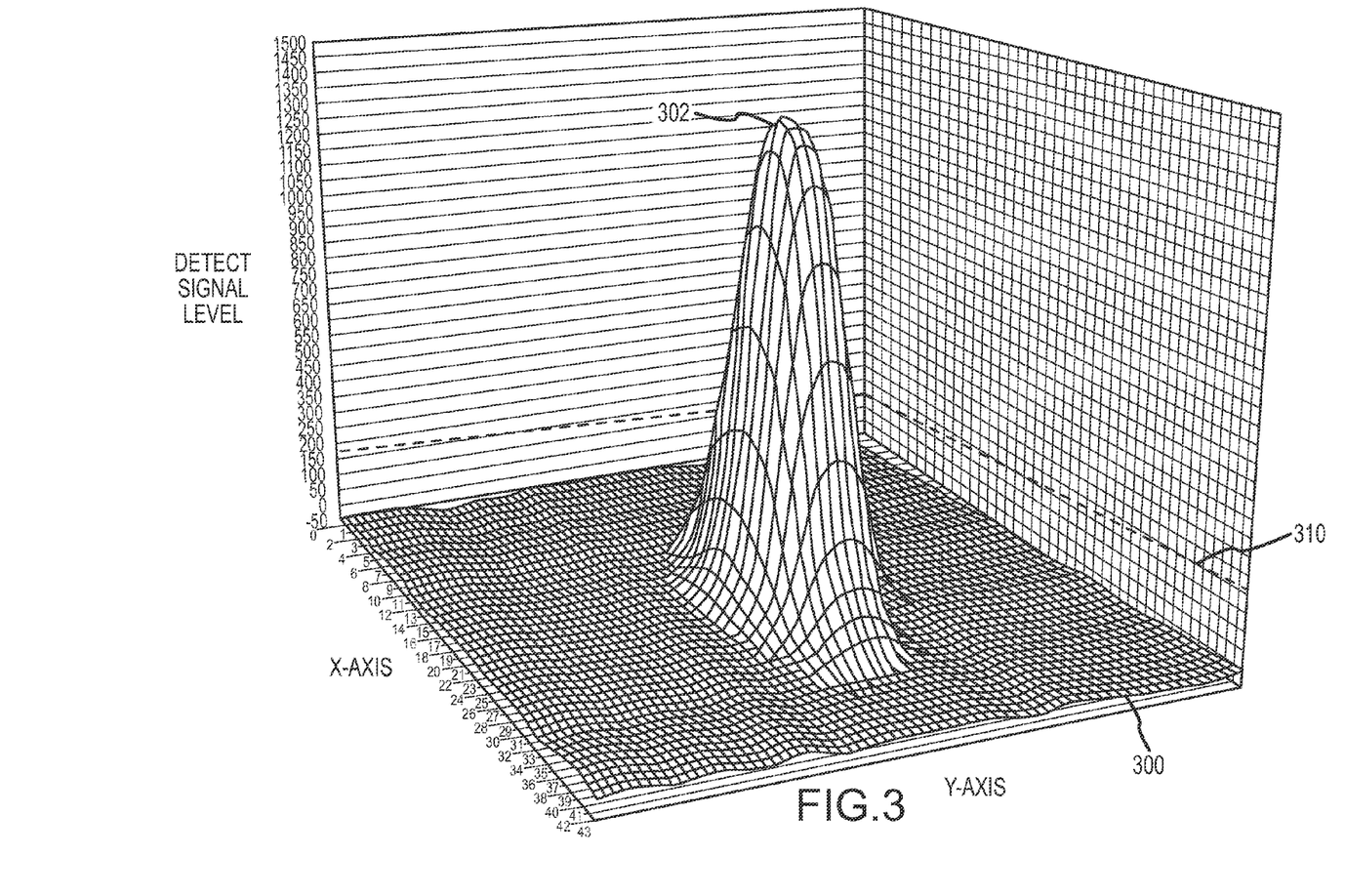
FIG. 3 illustrates a signal profile associated with a touch event produced by an exemplary manipulator.

FIGS. 2 and 3 depict example signal profiles 200 and 300 corresponding, respectively, to a typical stylus and a typical human finger. More particularly, profiles 200 and 300 consist of a series of detected signal levels along the surface of touch sensor component 110 (z-axis), where the x and y axes correspond to spatial position on the surface. Stated another way, signal profiles 200 and 300 can be seen as two-dimensional manifolds within a three-dimensional space, as shown, that uniquely characterize their respective touch events. These shapes can be analyzed (e.g., to determine area, shape, etc.) as described in further detail below. The analyzed shapes thus become a geometrical "signature" of the touch event.

In alternate embodiments, other types of signatures of touch events may be similarly analyzed. For example, two or more physically separated acoustic sensors (such as piezo crystal sensors) may be coupled to the touch surface such that, through analysis of the sound received by each of the sensors, the touch profile can be determined and subsequently analyzed based on its acoustic characteristics.

As shown in FIG. 2, if the traditional sensing threshold 210 is set too high (e.g., for a human finger input mode), then the stylus signal profile 200 will not trigger a touch event, as the peak 202 is well below threshold 210. Conversely, as shown in FIG. 3, if threshold 310 is set too low (i.e., for a stylus input mode), then peak 302 of finger signal profile 300 will be much greater than threshold 310, and is likely to result in "false positives"—i.e., touch events that are triggered erroneously in response to proximity of the user's finger.

Therefore, in accordance with the present embodiments, systems and methods are provided for distinguishing between manipulator types based on one or more attributes of the signal profile (e.g., shape, size, area) at one or more predetermined threshold signal values. Stated in a mathematical sense, the system analyzes a cross-section of the signal profile along a plane that is orthogonal to the z-axis at a threshold value (i.e., the portion of the signal profile that exceeds the threshold signal value). The cross-section is analyzed to determine its area, shape, perimeter, aspect ratio, or any other geometrical attribute or signature, and that attribute is then used to determine the type of manipulator corresponding to the signal profile. The system then switches to the correct input mode, adjusting the signal gain and other parameters accordingly.

Figure 4:
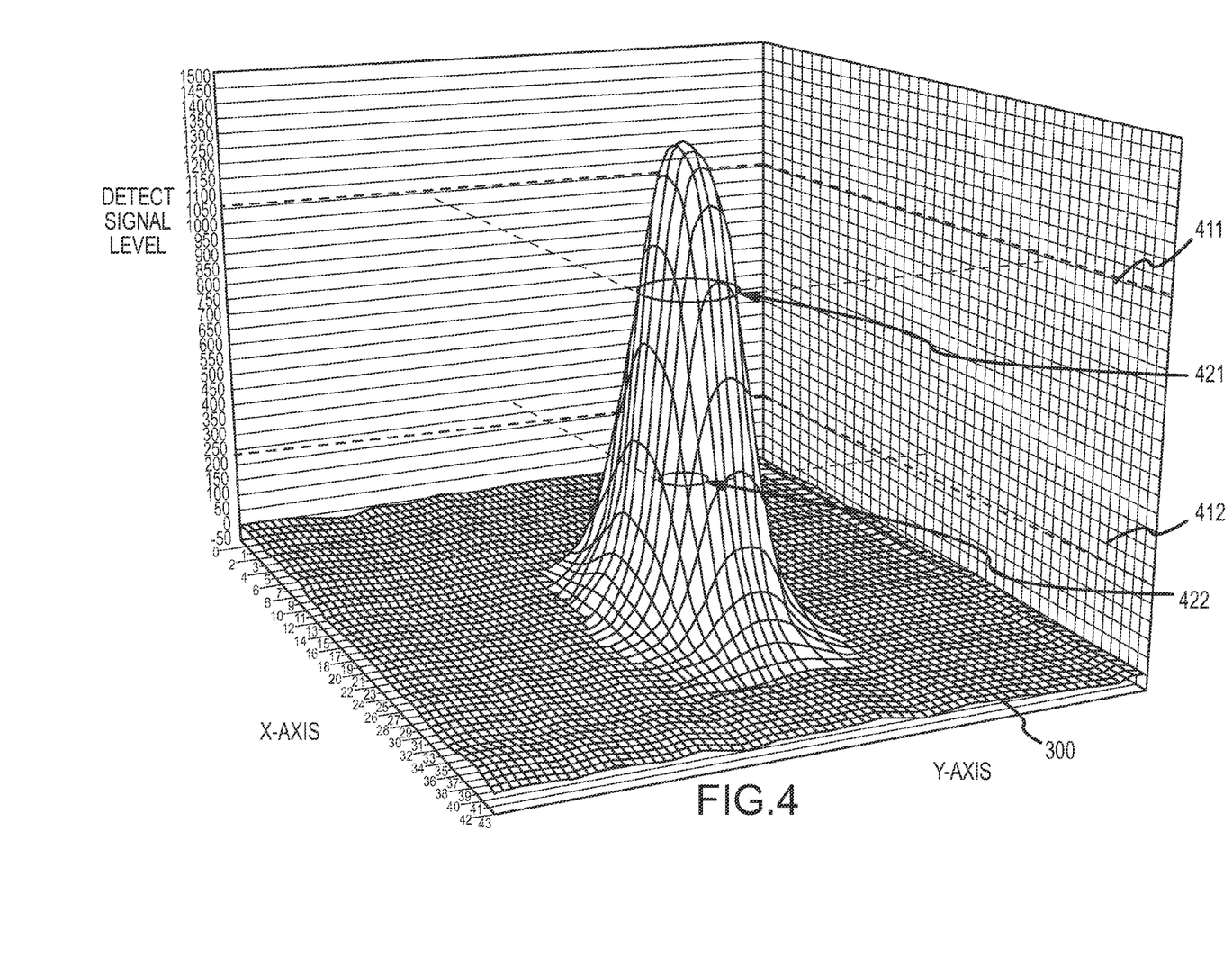
FIGS. 4 and 5 illustrate signal profiles and threshold attributes in accordance with one embodiment.
Figure 5:
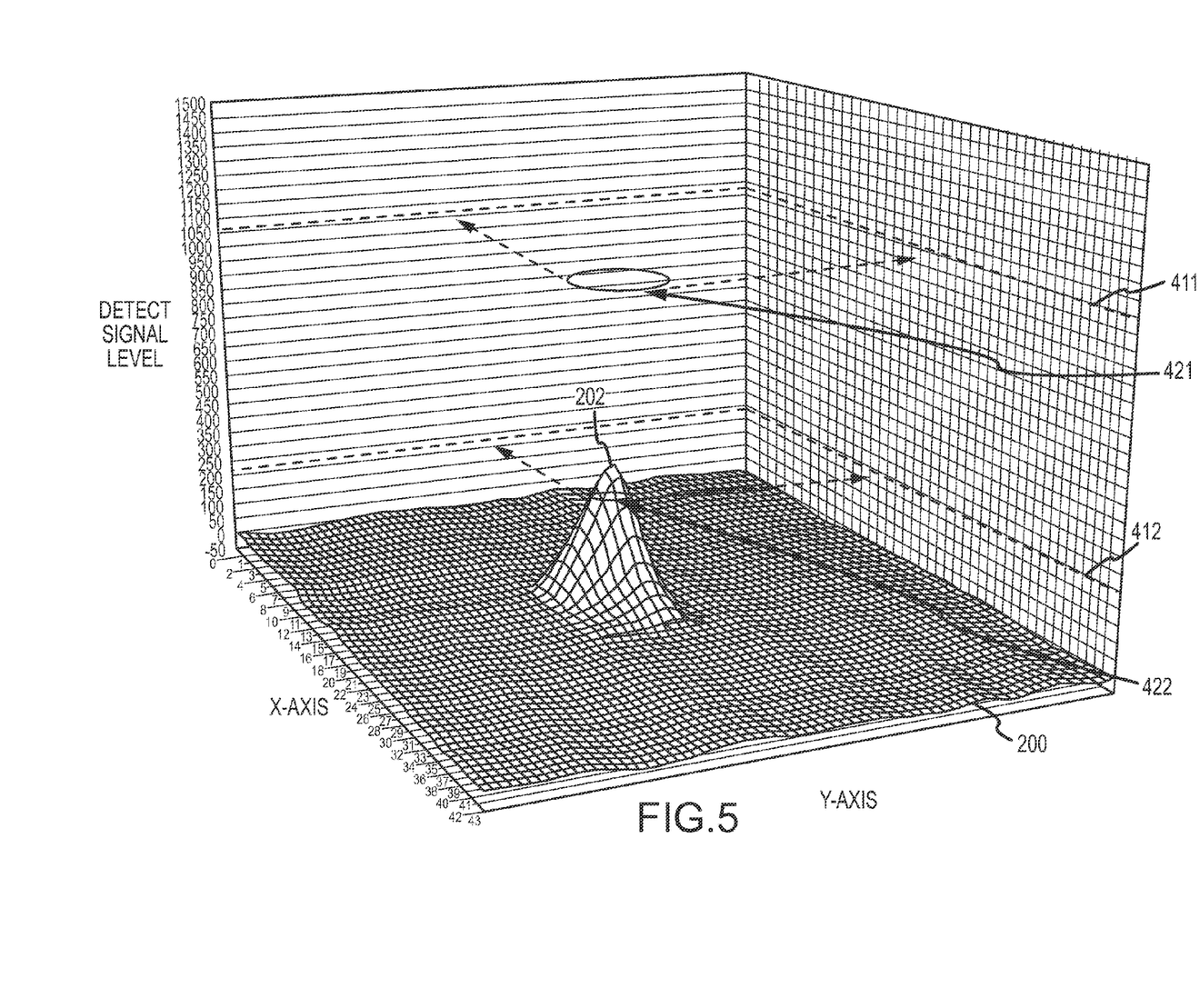

Referring now to FIGS. 4 and 5, in one embodiment, the total area of the cross-section at a threshold signal value is the particular attribute used to distinguish between manipulator types. That is, as shown in FIG. 4, the system utilizes multiple predetermined threshold values, such as the exemplary two illustrated: threshold value 411 (which may correspond, for example, to a finger threshold value), and threshold value 412 (which may correspond, for example, to a stylus threshold value). The system also knows, a priori, two cross-sectional area values: threshold cross-sectional area 421, and threshold cross-sectional area 422, corresponding respectively to threshold values 411 and 412. As illustrated, threshold value 412 is less than threshold value 411, and its area 422 is less than area 421. This corresponds generally to the finger/stylus distinction described earlier in connection with FIGS. 1 and 2. In any particular embodiment, any number of such areas and threshold values may be used, each corresponding to a different type of manipulator.

Thus, in the illustrated embodiment, given a particular signal profile 300 or 200, the system examines the cross-sectional area at threshold values 411 and 412 and determines whether that area is substantially equal (within some reasonable tolerance) to corresponding area 421 or 422. This tolerance, which will generally vary depending upon the nature of the touch screen sensor, may be selected based on empirical testing, computer modeling, or through any other method known in the art.

As shown in FIG. 4 (depicting a finger signal profile 300) the cross-sectional area at threshold value 411 is substantially equal to area 421, but much greater than area 422. The system would then consider the "threshold" for the finger-type manipulator to be met. Similarly, FIG. 5 shows the case of a stylus signal profile 200 that meets the threshold for a stylus-type manipulator.

Figure 6:
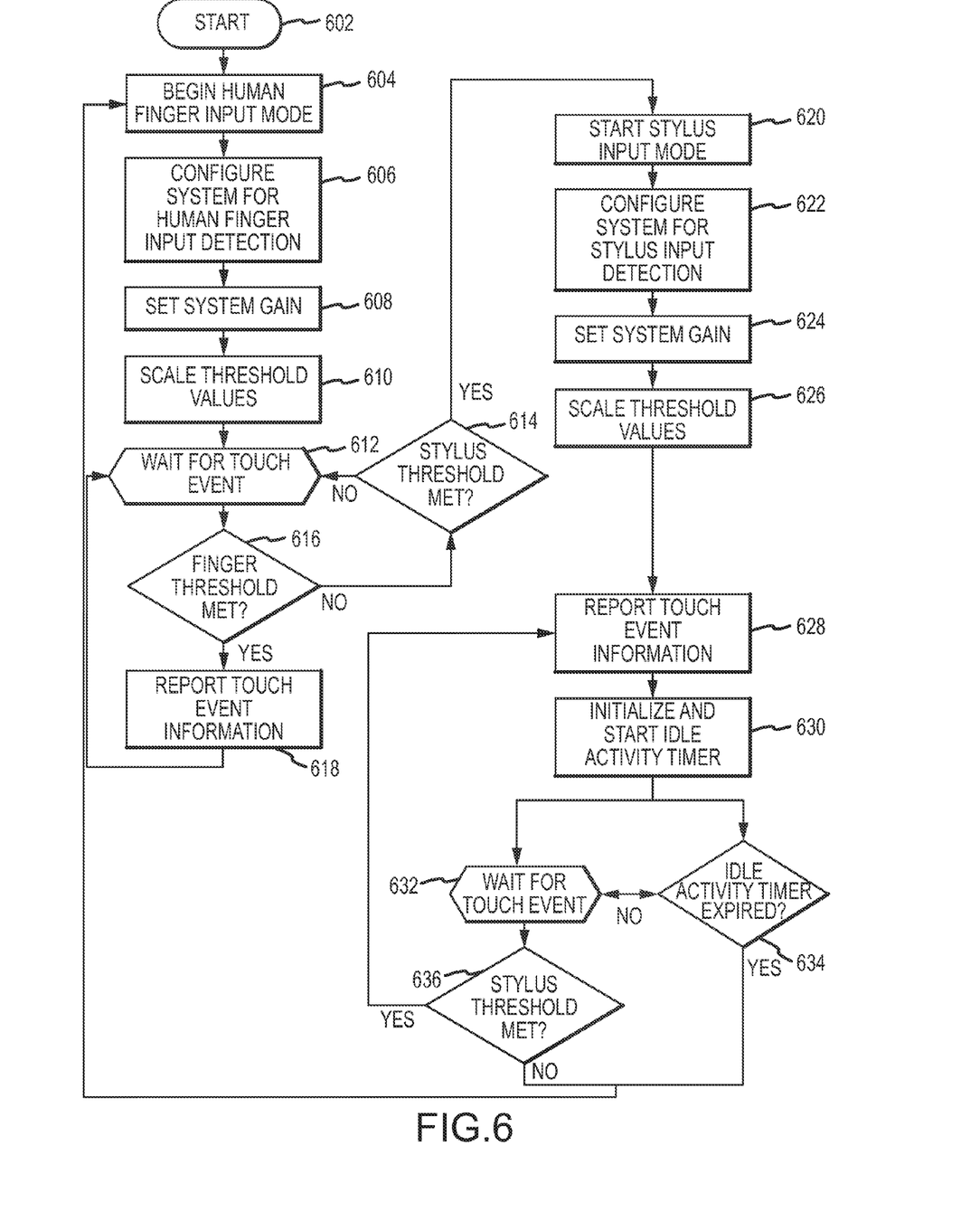
FIG. 6 is a flow chart illustrating an exemplary method in accordance with one embodiment.

FIG. 6 is a flowchart depicting an exemplary method in accordance with one embodiment. While this example is described in the context of two types of manipulators—stylus and finger—the invention is not so limited, and may be used in connection with any number and type of manipulators.

Initially, the process begins (602) in response to user input, power-up, or any suitable event. By default, the system enters human finger input mode (604). This default condition is particularly advantageous in cases where a stylus or other manipulator is stored in a cavity in a mobile device, and user would, for the purpose of convenience, generally prefer to use a finger for input whenever possible.

Next, in step 606, the system configures the touch system for human finger input detection. Typically, for example, the system gain (i.e., the gain used to produce the signal profile) is set to a value appropriate for a nominally sized human finger (step 608). Similarly, the threshold values described above are scaled based on the expected signal during human finger input mode (step 610).

In step 612, the system waits for a touch event. Such events may include a variety of conventional events indicating interaction of a user with a touch surface, e.g., single presses, multi-touch, dragging, gestures, and the like.

Next, in step 616, the system queries whether the finger threshold is met. That is, the magnitude of the cross-sectional area of the signal profile at the finger threshold value (as described above) is compared to the predetermined area value. If the two are substantially the same, then the procedure continues with step 618, reporting touchscreen information in a loop as illustrated. The touchscreen information may be reported as position data, as an interrupt, or in any other manner depending upon the nature of the software utilizing the information.

If, in step 616, the finger threshold was not met, the process continues with step 614 and queries whether the stylus threshold is met. That is, the cross-sectional area of the signal profile at the stylus threshold value (as described above) is compared to the predetermined area value. If the two are not substantially the same, then the procedure proceeds back to step 612 and waits for a touch event. If the stylus threshold is met, however, the process continues to step 620 and begins stylus input mode.

In step 622, the touch system is configured for stylus input detection. As with step 606 above, this step will typically involve adjusting the gain and threshold values so that they are suitable for interpreting stylus touch events (steps 624 and 626). Subsequently, in step 628, the touchscreen event information is reported.

In step 630, the system initializes and starts an idle activity timer, and then waits for the next touch event (step 632). If, after the touch event, the stylus threshold is met (step 636), the procedure loops back to step 628, and continues as before. If not, or if the idle activity timer has expired (step 634), the procedure loops back to step 604, reverting once again to finger input mode.

While the flow chart above illustrates the use of two threshold values and two corresponding geometrical attributes, any number of such threshold may be used. For example, it may be advantageous in some applications to recognize touch events produced by long fingernails in addition to finger and stylus manipulators.

The systems and methods described above may be implemented in a variety of devices, including, for example, cellular phones (or "smartphones"), GPS systems, e-book readers, tablet computers, netbook computers, point-of-sale devices, gaming devices, pen pads, and any other apparatus that may include a touch system. In general, however, such devices are typically special-purpose or general-purpose computing devices including one or more microprocessors, memory components, and the like as is known in the art.

Figure 7:
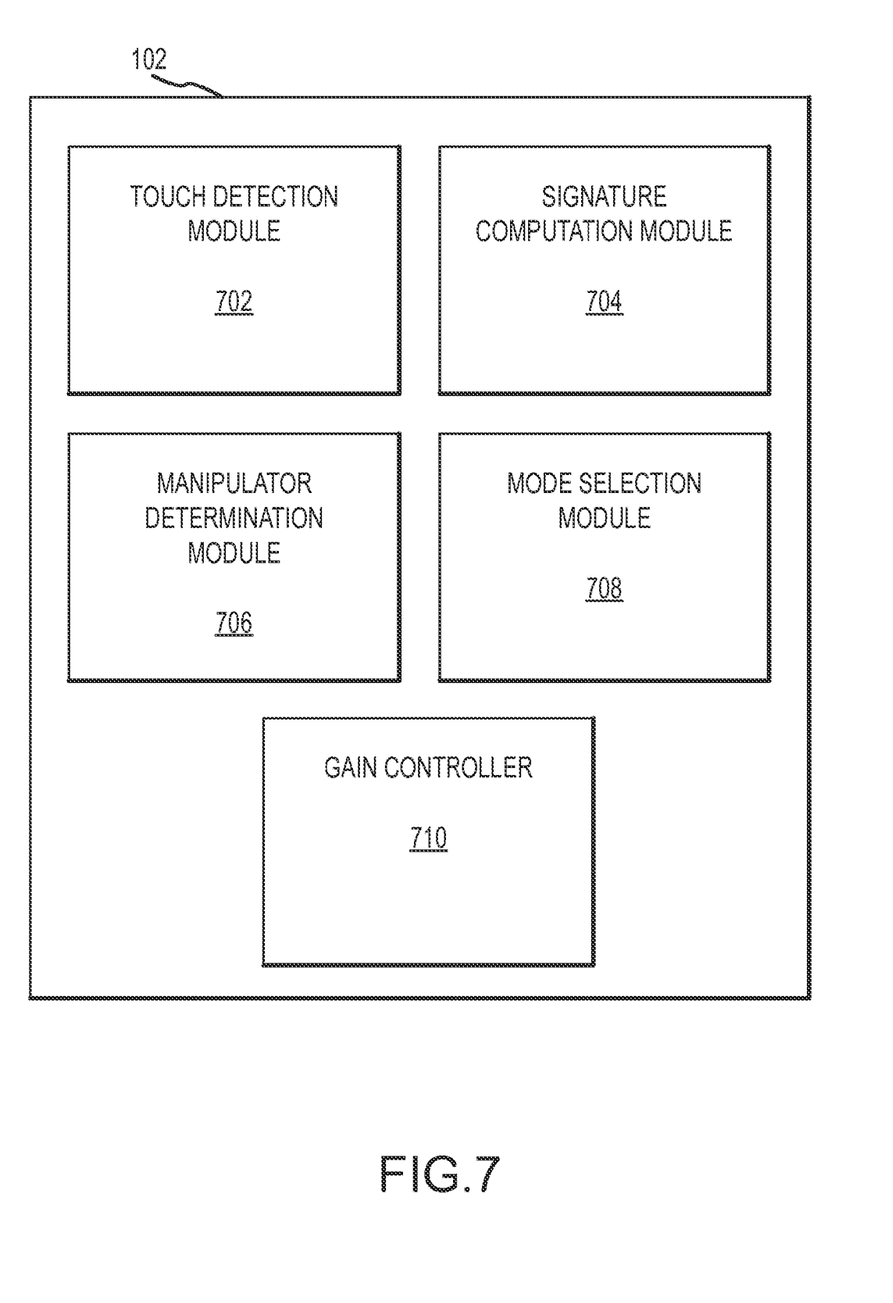
FIG. 7 is a conceptual block diagram of various modules executed by an exemplary processor.

The systems and methods may be implemented by one or more sets of stored instructions for execution by processor 102, which may be grouped conceptually into logical "modules." Referring to FIG. 7, for example, processor 102 may include a touch detection module 702, a signature computation module 704, a manipulator determination module 706, a mode selection module 708, and a gain controller 710. Touch detection module 702 generally detects touch events and determines a signal profile associated with the sensor signal. Signature computation module 704 calculates an attribute of the signal profile at a threshold signal value—for example, a geometrical attribute of the cross-sectional area at the threshold signal value, or any other suitable attribute that can provide a "signature" associated with different manipulators.

Manipulator determination module 706 determines the type of the manipulator based on the computed geometrical attribute, and gain controller 710 adjusts the gain of the signal profile, the geometrical attribute, and the threshold level values as described above.

It will be understood that the term module as used herein does not limit the functionality to particular physical modules, but may include any number of software components. In general, a computer program product in accordance with one embodiment comprises a computer usable medium (e.g., standard RAM, an optical disc, a USB drive, or the like) having computer-readable program code embodied therein, wherein the computer-readable program code is adapted to be executed by processor 102 (working in connection with an operating system) to implement a method as described above. In this regard, the program code may be implemented in any desired language, and may be implemented as machine code, assembly code, byte code, interpretable source code or the like (e.g., via C, C++, Java, Actionscript, Objective-C, Javascript, CSS, XML, etc.).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A user interface method comprising:
   determining a signal profile associated with the use of a manipulator with a touch sensor component, the signal profile corresponding to a plurality of signal levels along a surface of the touch sensor component;
   calculating a geometrical attribute of that portion of the signal profile having a value that exceeds a threshold signal value; and
   determining a type of the manipulator based on the calculated geometrical attribute;
   wherein calculating the geometrical attribute includes calculating a first cross-sectional area of the signal profile at a first threshold signal value, and calculating a second cross-sectional area of the signal profile at a second threshold signal value; and
   wherein determining the type of the manipulator includes determining that the type of the manipulator is a first type when the first cross-sectional area is substantially equal to a first threshold cross-sectional area, and determining that the type of the manipulator is a second type when the second cross-sectional area is substantially equal to a second threshold cross-sectional area.

2. The user interface method of claim 1, wherein the geometric attribute is selected from the group consisting of perimeter shape and planar area.

3. The user interface method of claim 1, further including selecting an input mode from a plurality of input modes based on the type of the manipulator.

4. The user interface method of claim 3, further including selecting a default mode from the plurality of input modes after a predetermined period of inactivity of the touch sensor component.

5. The user interface method of claim 1, further including selecting a first input mode when the manipulator is the first type, and selecting a second input mode when the manipulator is the second type.

6. The user interface method of claim 5, further including reporting a plurality of touch system events using the selected input mode until the cross-sectional area of the signal profile at a threshold signal value is not substantially equal to the threshold cross-sectional area corresponding to the selected input mode.

7. The user interface method of claim 5, wherein the first type corresponds to a human finger, and the second type corresponds to a stylus.

8. The user interface method of claim 7, wherein the first threshold signal value is greater than the second threshold signal value.

9. The user interface method of claim 1, wherein determining the signal profile includes receiving a signal profile associated with a capacitive touch sensor component.

10. A touch system comprising:
    a touch sensor component; and
    a processor configured to receive a sensor signal from the touch sensor component;
    wherein the processor includes a touch detection module configured to determine a signal profile associated with the sensor signal, a signature computation module which is configured to calculate an attribute of the signal profile at a threshold signal value, and a manipulator determination module, which is configured to determine a type of the manipulator based on the computed attribute;
    wherein the calculated attribute is a cross-sectional area, and the signal computation module of the processor is further configured to:
    determine a first cross-sectional area of the signal profile at a first threshold signal value, and calculate a second cross-sectional area of the signal profile at a second threshold signal value;
    determine that the type of the manipulator is a first type when the first cross-sectional area is substantially equal to a first threshold cross-sectional; and
    determine that the type of the manipulator is a second type when the second cross-sectional area is substantially equal to a second threshold cross-sectional area.

11. The touch system of claim 10, wherein the processor includes a mode selection module configured to select one of a plurality of input detection modes based upon the type of the manipulator.

12. The touch system of claim 11, wherein the mode selection module of the processor is further configured to select a default mode from the plurality of input modes after a predetermined period of inactivity of the touch sensor component.

13. The touch system of claim 10, wherein the mode selection module of the processor is further configured to select a first input mode when the manipulator is the first type, and select a second input mode when the manipulator is the second type.

14. The touch system of claim 13, wherein the touch detection module of the processor is further configured to report a plurality of touch system events using the selected input mode until the cross-sectional area of the signal profile at a threshold signal value is not substantially equal to the threshold cross-sectional area corresponding to the selected input mode.

15. The touch system of claim 13, wherein the processor further includes a gain controller configured to scale a gain associated with the touch sensor component based on the selected mode.

16. The touch system of claim 13, wherein the first type corresponds to a human finger, and the second type corresponds to a stylus.

17. The touch system of claim 10, wherein one or more of the touch detection module, the signature computation module, and the manipulator determination module includes one or more sets of stored instructions for execution by a microprocessor.

18. A wireless communication device including a touch system, the touch system comprising:
- a touch sensor component for detecting an interaction with a touch sensor surface and producing a sensor signal associated therewith; and
- a processor configured to receive the sensor signal from the touch sensor component;
- wherein the processor includes a touch detection module configured to determine a signal profile associated with the sensor signal, a cross sectional area computation module configured to calculate a geometrical attribute of the signal profile; and a manipulator determination module configured to determine a type of the manipulator based on the computed geometrical attribute;
- wherein the computed geometrical attribute is a cross-sectional area, and the processor is further configured to:
  - determine a first cross-sectional area of the signal profile at a first threshold signal value, and calculate a second cross-sectional area of the signal profile at a second threshold signal value;
  - determine that the type of the manipulator is a first type when the first cross-sectional area is substantially equal to a first threshold cross-sectional; and
  - determine that the type of the manipulator is a second type when the second cross-sectional area is substantially equal to a second threshold cross-sectional area.

* * * * *